(12) United States Patent
Bray

(10) Patent No.: US 12,181,021 B2
(45) Date of Patent: Dec. 31, 2024

(54) TRANSMISSION HOUSING, GEARBOX AND WHEELED VEHICLE PROVIDED WITH SUCH A GEARBOX

(71) Applicant: FRANCE REDUCTEURS, Les Herbiers (FR)

(72) Inventor: Sébastien Bray, Les Epesses (FR)

(73) Assignee: FRANCE REDUCTEURS, Les Herbiers (FR)

( * ) Notice: Subject to any disclaimer, the term of this patent is extended or adjusted under 35 U.S.C. 154(b) by 9 days.

(21) Appl. No.: 18/015,070

(22) PCT Filed: Jun. 24, 2021

(86) PCT No.: PCT/FR2021/051164
§ 371 (c)(1),
(2) Date: Jan. 8, 2023

(87) PCT Pub. No.: WO2022/018337
PCT Pub. Date: Jan. 27, 2022

(65) Prior Publication Data
US 2023/0272840 A1    Aug. 31, 2023

(30) Foreign Application Priority Data
Jul. 23, 2020    (FR) ..................................... 2007735

(51) Int. Cl.
*F16H 1/20* (2006.01)
*A01D 69/02* (2006.01)
(Continued)

(52) U.S. Cl.
CPC ............... *F16H 1/206* (2013.01); *F16H 1/24* (2013.01); *F16H 55/06* (2013.01); *F16H 57/021* (2013.01);
(Continued)

(58) Field of Classification Search
CPC . F16H 1/206; F16H 1/24; F16H 55/06; F16H 57/021; F16H 2057/02034; F16H 2057/02056; A01D 69/02; A01D 69/06
See application file for complete search history.

(56) References Cited

U.S. PATENT DOCUMENTS 4,570,734 A * 2/1986 Taig ..................... B62D 5/0442
74/498
2016/0161898 A1    6/2016 Ishida et al.
(Continued)

FOREIGN PATENT DOCUMENTS

CN        203 429 444        2/2014
CN        203429444 U    *  2/2014

OTHER PUBLICATIONS

International Search Report dated Mar. 15, 2021.

*Primary Examiner* — Terence Boes
(74) *Attorney, Agent, or Firm* — IPSILON USA, LLP

(57) ABSTRACT

A transmission housing (1) which can be coupled to the drive shaft (21) of an electric motor (20) to form a gearbox (22), the transmission housing (1) comprising a housing body (2) defining a cavity (4), and housed at least partially inside the cavity (4)—a rotary drive member (5),—an output shaft (6) and,—a device (7) for transmitting the rotational movement of the rotary drive member (5) to the output shaft (6), characterised in that the rotary drive member (5) is supported inside the cavity (4) of the housing body (2) by one or more guide members (8) and comprises a wall (9) and two coaxial helical teeth (10) created from a single part with the wall (9) and arranged on either side of the wall (9), the helical teeth (10) being configured to generate axial forces in opposite directions.

10 Claims, 9 Drawing Sheets

(51) Int. Cl.
 *A01D 69/06* (2006.01)
 *F16H 1/24* (2006.01)
 *F16H 55/06* (2006.01)
 *F16H 57/02* (2012.01)
 *F16H 57/021* (2012.01)

(52) U.S. Cl.
 CPC .............. *A01D 69/02* (2013.01); *A01D 69/06* (2013.01); *F16H 2057/02034* (2013.01); *F16H 2057/02056* (2013.01)

(56) References Cited

U.S. PATENT DOCUMENTS

| | | | |
|---|---|---|---|
| 2020/0047792 A1* | 2/2020 | Washnock | B62D 3/123 |
| 2020/0047793 A1* | 2/2020 | Washnock | F16H 19/04 |
| 2021/0053611 A1 | 2/2021 | Washnock et al. | |

* cited by examiner

TRANSMISSION HOUSING, GEARBOX AND WHEELED VEHICLE PROVIDED WITH SUCH A GEARBOX

RELATED APPLICATION

This application is a National Phase of PCT/FR2021/051164 filed on Jun. 24, 2021, which claims the benefit of priority from French Patent Application No. 20 07735, filed on Jul. 23, 2020, the entirety of which are incorporated by reference.

FIELD OF THE INVENTION

The present invention relates to a transmission housing and to a geared motor unit and a wheeled machine equipped with such a geared motor unit.

It relates in particular to a transmission housing which can be coupled to the motor shaft of an electric motor to form a geared motor unit, said transmission housing comprising a housing body defining a cavity, and, housed at least partially inside the cavity:
  a rotary driving element,
  an output shaft, and
  a device for transmitting the rotational movement of the rotary driving element to the output shaft.

PRIOR ART

Such a transmission housing is known. Such a housing can be used in wheeled machines, such as robot mowers. Such machines may be intended to remain permanently outdoors and to operate even in the presence of people. It is therefore important for such a transmission housing to allow smooth power transfer in order to limit noise pollution without compromising the compactness and simplicity of said transmission housing.

OBJECTS AND SUMMARY

An object of the invention is therefore to provide a transmission housing of the aforementioned type, the design of which allows the production of a simple and compact housing capable of allowing smooth power transfer in order to limit noise pollution.

To this end, the subject of the invention is a transmission housing which can be coupled to the motor shaft of an electric motor to form a geared motor unit, said transmission housing comprising:
  a housing body defining a cavity, and, housed at least partially inside the cavity:
  a rotary driving element,
  an output shaft, and
  a device for transmitting the rotational movement of the rotary driving element to the output shaft, characterized in that the rotary driving element is supported inside the cavity of the housing body by one or more guide members and comprises a wall and two coaxial helical toothsets made in one piece with the wall and arranged on either side of said wall. The design of the rotary driving element intended to come into meshed engagement with the motor shaft allows smooth power transfer without compromising the compactness and simplicity of the assembly.

According to one embodiment of the invention, the or at least one of the guide members is a rolling-contact bearing housed in the thickness of the rotary driving element. This arrangement makes it possible to limit the size of the assembly.

According to one embodiment of the invention, the or at least one of the guide members is housed inside a recess of the rotary driving element and is surrounded by one of the toothsets of said rotary driving element. This design allows a compact construction.

According to one embodiment of the invention, the recess is delimited by a circular lateral partition coaxial with said toothset.

According to one embodiment of the invention, the circular lateral partition and the toothset delimit between them an annular space. This annular space serves to receive the motor shaft in the state in which the motor shaft and the transmission housing are coupled.

According to one embodiment of the invention, the wall of the rotary driving element has two opposite faces, and the toothsets are arranged one projecting from one of the faces, the other projecting from the other face of said wall.

According to one embodiment of the invention, one of the toothsets is made on an annulus made in one piece with the wall of the rotary driving element extending projecting from one of the faces of the wall, said annulus having an internal circumferential surface and an external circumferential surface, said toothset being disposed on the internal circumferential surface of said annulus.

According to one embodiment of the invention, one of the toothsets is formed on a shaft end projecting from one of the faces of the wall and made in one piece with said wall, this toothset being arranged on at least part of the external peripheral surface of said shaft end.

According to one embodiment of the invention, the helical toothsets have helices of the same direction.

According to one embodiment of the invention, the helical toothsets have helices of opposite direction.

According to one embodiment of the invention, the rotary driving element is made of synthetic material. This design contributes to the simplicity of the transmission housing.

According to one embodiment of the invention, the device for transmitting the rotational movement of the rotary driving element to the output shaft is a toothed wheel integral in terms of rotation with the output shaft and in meshed engagement with one of the toothsets of the rotary driving element. Such a transmission device is characterized by its simplicity.

Another subject of the invention is a geared motor unit comprising an electric motor fitted with a motor shaft and a transmission housing which can be coupled to the motor shaft of said motor, characterized in that the transmission housing is in accordance with that described hereinabove and in that, in the state in which the motor shaft and the transmission housing are coupled, the motor shaft is in mesh with the rotary driving element of the transmission housing.

Another subject of the invention is a wheeled machine equipped with a geared motor unit, characterized in that the geared motor unit is in accordance with that described hereinabove.

BRIEF DESCRIPTION OF THE DRAWINGS

The invention will be clearly understood on reading the following description of exemplary embodiments, with reference to the appended drawings, in which.

DETAILED DESCRIPTION

Figure 1:
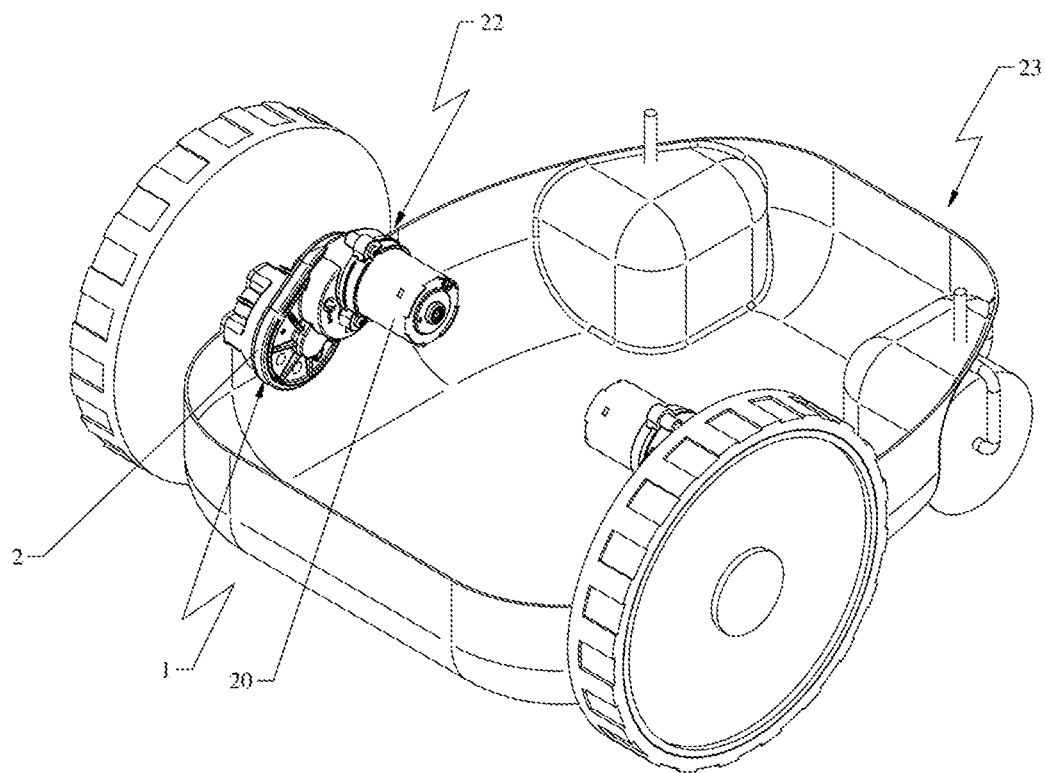
FIG. 1 shows a partial perspective view of the interior of a wheeled machine equipped with a transmission housing according to the invention.
Figure 2:
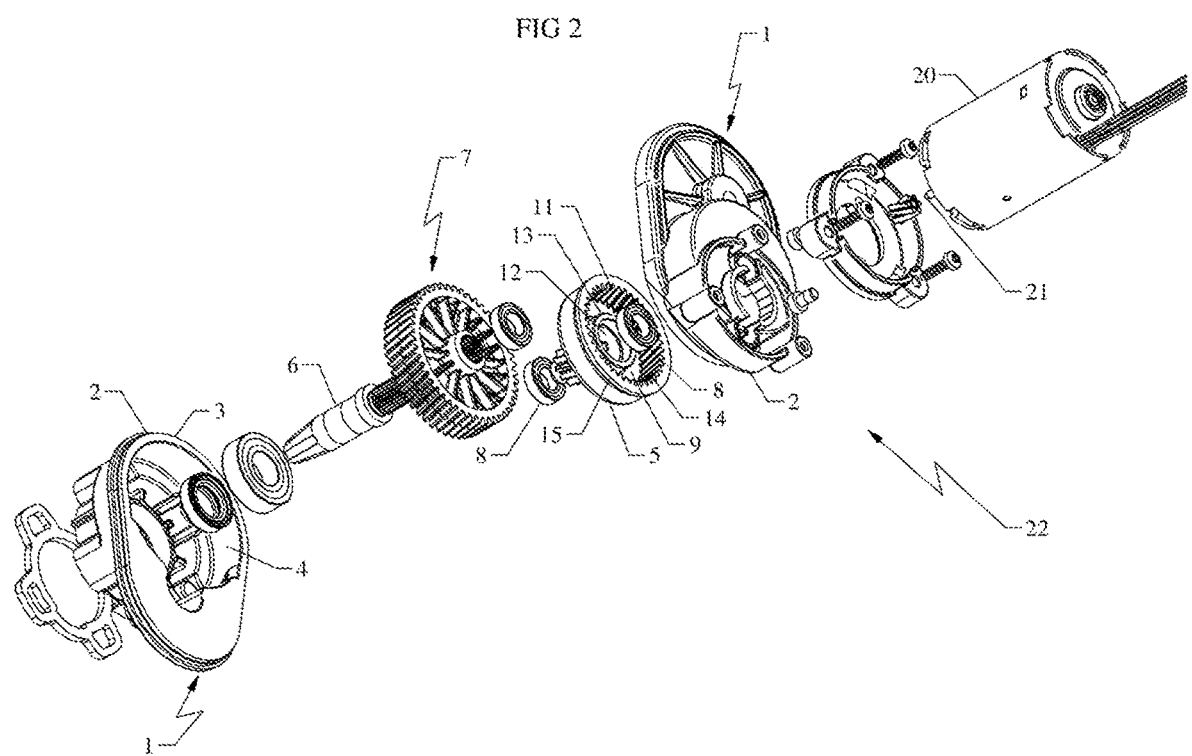
FIG. 2 shows an exploded view of the elements of a geared motor unit according to the invention.
Figure 3:
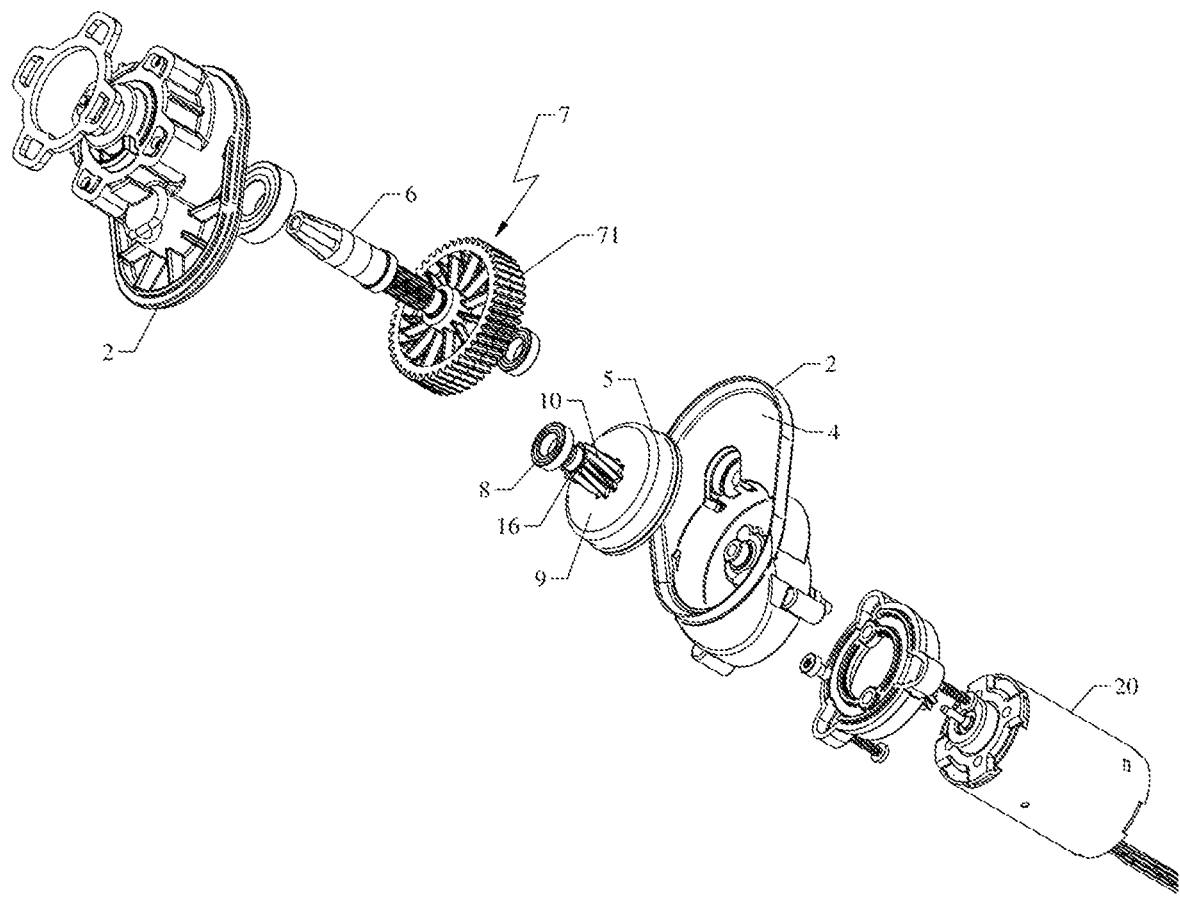
FIG. 3 shows an exploded view of the elements of a geared motor unit according to the invention.
Figure 4:
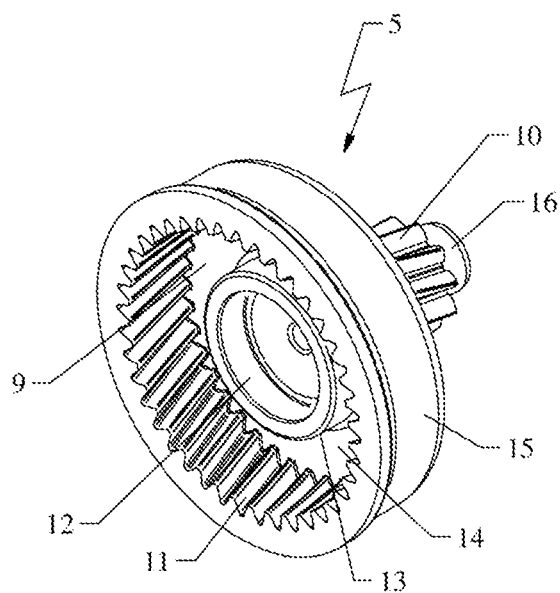
FIG. 4 shows a perspective view of a rotary driving element.
Figure 5:
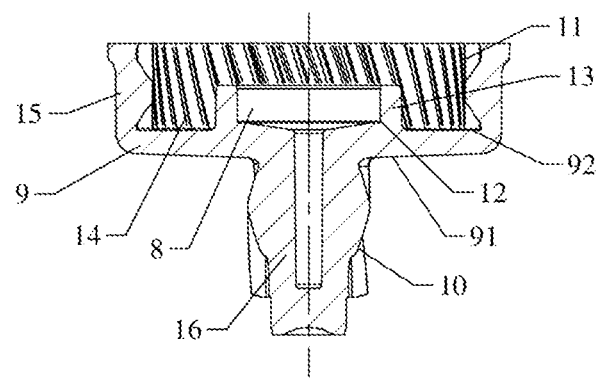
FIG. 5 shows a sectional view of a rotary driving element.
Figure 6:
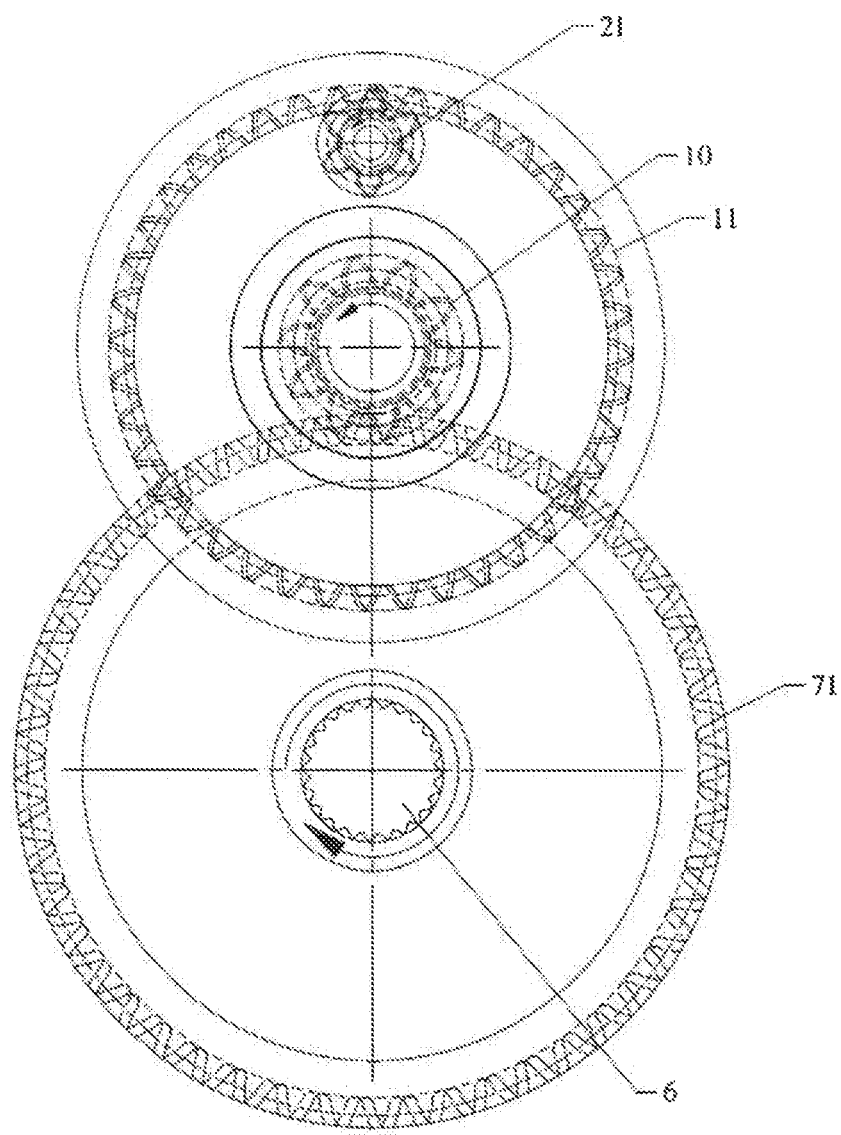
FIG. 6 represents a sectional view illustrating the transmission of movement between the motor shaft and the output shaft.

As mentioned above, the invention relates to a transmission housing 1 intended to be coupled to the motor shaft 21 of an electric motor 20 to form a geared motor unit 22, to the resulting geared motor unit 22, as well as to a wheeled machine 23 equipped with such a transmission housing 1 as shown in FIG. 1.

This wheeled machine 23 can be a self-moving machine without a driver seated on or walking behind the machine. This wheeled machine 23 can thus be a robot, such as a robot mower, a robot vacuum cleaner or the like. In this case, the transmission housing 1 is a housing for transmitting the rotational movement of the motor shaft 21 of the electric motor 20 to an output shaft 6 equipping the transmission housing 1, this output shaft 6 being able to form the drive shaft driving a wheel of the machine.

In the example shown, the machine 23 is therefore equipped with two transmission housings 1, namely one per driven wheel, and the steering of the machine is achieved by varying the speed of rotation of said driven wheels which can be driven at different speeds of rotation and/or in different directions of rotation. The wheeled machine 1, here produced in the form of a robot mower, can therefore comprise, as partially shown in FIG. 1, a hollow rolling frame formed of a body and a cover. The transmission housing 1 is intended to be partially placed inside the enclosure delimited by the hollow frame of the robot.

This transmission housing 1 comprises a housing body 2, generally made of synthetic material. This housing body 2 comprises two or more shell elements 3 and defines, when the shell elements 3 are in the assembled state, a cavity 4. In the example shown, two shell elements 3 are provided. These shell elements 3 form, when assembled along a parting plane, the cavity 4. This assembled state of the shell elements 3 corresponds to the closed state of the transmission housing 1. These shell elements 3 are preferably assembled with one another by welding, such as ultrasonic welding. This results in a good sealing of the assembly.

The transmission housing 1 further comprises a transmission device 7 housed at least partially inside the cavity 4 defined by the body 2 of the housing 1. This transmission device 7 extends between a rotary driving element 5 with which said transmission housing 1 is equipped, and the machine-wheel-driving output shaft 6 of said transmission housing 1 and allows the transmission of the rotational movement of the rotary driving element 5 to the output shaft 6.

The rotary driving element 5 is housed inside the cavity 4 and is supported inside the cavity 4 of the housing body 2 by at least one, and in this case two, guide members 8, also housed inside the housing body 2. These guide members 8 are here in the form of rolling-contact bearings.

The rotary driving element 5 comprises a wall 9 and two coaxial helical toothsets 10 and 11 made in one piece with the wall 9 and arranged on either side of the wall 9. These toothsets are in permanent engagement, one of them, indicated as 10, with the movement transmission device 7, and the other, indicated as 11, with the motor shaft 21, in the state in which the shaft 21 of the motor 20 is coupled to the transmission housing 1.

These helical toothsets 10 and 11 are, in the state in which the rotary driving element 5 is being rotationally driven, configured to generate axial forces. These axial forces are indicated as Fa in FIGS. 7A and 7B.

In practice, the wall 9 of the rotary driving element 5 has two opposite faces indicated as 91 and 92 in the figures. The toothsets 10 and 11 are themselves arranged, one, indicated as 10, projecting from the face 91, and the other, indicated as 11, projecting from the face 92 of the wall 9. This wall 9 extends inside the housing body 2 orthogonally to the motor shaft 21 or to the output shaft 6.

The toothset 11 is provided on an annulus 15 made in one piece with the wall 9 of the rotary driving element 5. This annulus 15 projects from the face 92 of the wall 9. The annulus 15 has an internal circumferential surface and an external circumferential surface. The toothset 11 is arranged on the internal circumferential surface of the annulus 15. The toothset 11 is therefore arranged inside said annulus.

The annulus 15 is here formed by a rim of the circular wall 9, this rim extending projecting from one face, namely the face 92, of said wall 9. The opposite faces of this rim constitute the external and internal circumferential surfaces of the annulus 15.

The other toothset, indicated as 10 in the figures, is provided on a shaft end 16 extending projecting from the face 91 of the wall 9. This toothset 10 is arranged on at least part of the external peripheral surface of the shaft end 16.

This shaft end 16 here extends perpendicularly to the wall 9 of the rotary driving element 5 and is made in one piece with said wall 9 of the rotary driving element 5.

Figure 7A:
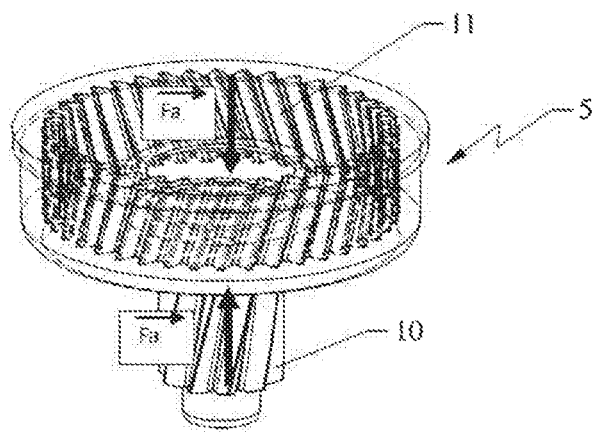
FIG. 7A shows a perspective view of a rotary driving element illustrating the axial forces in opposite directions of helical toothsets of which the helices are in the same direction.
Figure 7B:
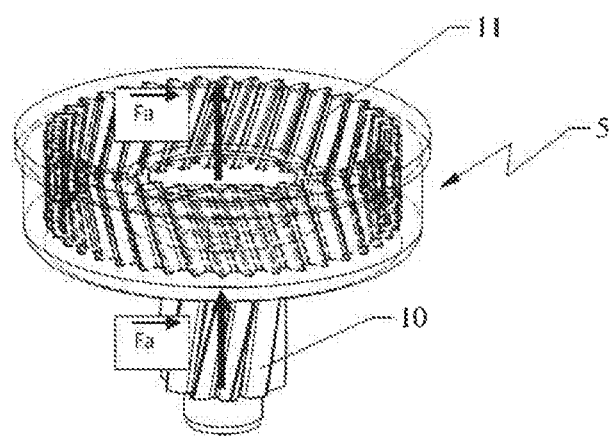
FIG. 7B shows a perspective view of a rotary driving element illustrating the axial forces of helical toothsets of which the helices are in opposite directions.
Figure 8:
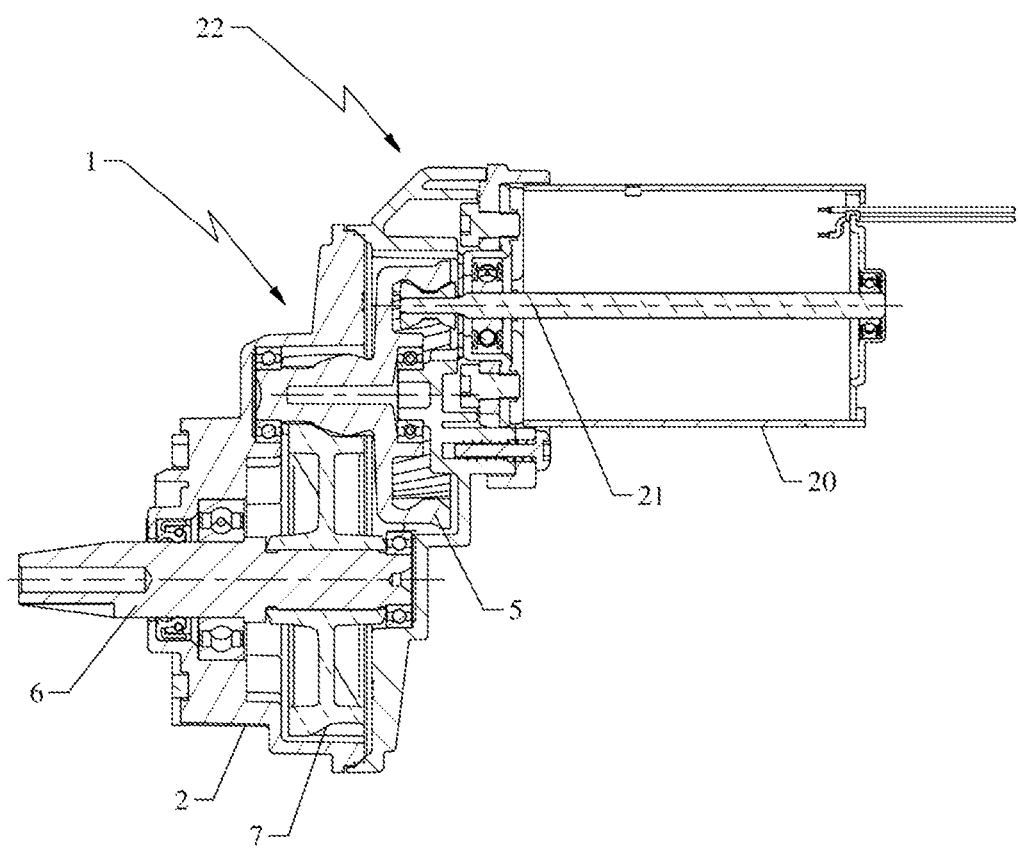
FIG. 8 shows a sectional view of a powertrain.

In the example represented in FIG. 7A, the helical toothsets 10 and 11 have helices in the same direction. In the example represented in FIG. 7B, the helical toothsets 10 and 11 have helices in opposite directions. The rotary driving element 5 is made of synthetic material, in particular of polyamide optionally filled with fibers and is preferably a molded part.

As mentioned above, the rotary driving element 5 is supported inside the cavity 4 of the body 2 of the housing 1 by two guide members 8. One of the guide members 8 is housed in the thickness of the rotary driving element 5. This guide member 8, in this case a rolling-contact bearing, is housed inside a recess 12 of the rotary driving element 5 and is surrounded by the toothset, indicated as 11, of the rotary driving element 5. The toothset 11 is the toothset formed on the annulus 15.

The annulus 15 therefore surrounds the recess 12. Specifically, this recess 12 is delimited by a circular lateral partition 13 coaxial with the toothset 11. The circular lateral partition 13 and the toothset 11 delimit between them an annular space 14.

The circular lateral partition 13 delimiting the recess 12 and the toothset 11 arranged on the internal circumferential surface of the annulus 15 face each other. The annular space 14 serves to receive a part of the motor shaft 21 of the electric motor 20 which part is formed here by a pinion fitted to the end of the motor shaft 21. This pinion meshes with the toothset 11 to allow, in the state in which the motor shaft 21 is being rotationally driven, the rotation of the annulus 15 and consequently of the rotary driving element 5. The other guide member 8 is slipped onto the shaft end 16 which bears it. This guide member 8 extends over the shaft end 16 at the level of a part devoid of the toothset 10 of said shaft end 16. In the example shown, this guide member 8, which again is a rolling-contact bearing, is arranged at the end of said shaft end 16.

The device 7 for transmitting the rotational movement of the rotary driving element 5 to the output shaft 6 is a toothed wheel 71 integral in terms of rotation with the output shaft 6 and in meshed engagement with one of the toothsets, in this instance with the toothset 10, arranged on the shaft end 16. The axis of rotation of the toothed wheel and the axis of rotation of the rotary driving element 5 are parallel. The wall 9 of the rotary driving element 5 and the toothed wheel 71 extend at least partially in parallel planes.

The part of the motor shaft 21 engaged with the toothset 11 of the annulus 15 and housed in the annular space 14 between the toothset 11 and the circular partition 13 delimiting the recess 12 extends on one side of the plane parallel to the output shaft 6 and passing through the axis of rotation of the driving element 5, while the toothed wheel 71 of the transmission device 7 extends on the other side of said plane.

The transmission of rotational movement of the motor shaft 21 to the output shaft 6 therefore takes place as follows.

The motor shaft 21 rotates and is in permanent mesh with the toothset 11 of the annulus 15 so as to drive the rotary driving element 5 in rotation. The rotational driving of the rotary driving element 5 causes the rotation of the shaft end 16 which comes into meshed engagement, via its toothset 10, with the toothed wheel 71. This results in the rotational driving of the toothed wheel 71. This toothed wheel 71 is a centrally recessed wheel provided, at the level of the central recess, with a splined bore which is integral in terms of rotation with the output shaft 6, so that the output shaft 6 also rotates. This output shaft 6 is provided with ribs complementary to the splines of the splined central bore of the toothed wheel 71 to allow the toothed wheel and the output shaft to be secured to one another in terms of rotation.

The invention claimed is:

1. A transmission housing which can be coupled to the motor shaft of an electric motor to form a geared motor unit, said transmission housing comprising:
  a housing body defining a cavity, and, housed at least partially inside the cavity;
  a rotary driving element,
  an output shaft, and
  a device for transmitting the rotational movement of the rotary driving element to the output shaft,
    wherein the rotary driving element is supported inside the cavity of the housing body by one or more guide members and comprises a wall and two coaxial helical toothsets made in one piece with the wall and arranged on either side of said wall,
  the or at least one of the guide members is a rolling-contact bearing housed in a thickness of the rotary driving element, inside a recess of the rotary driving element and is surrounded by one of the toothsets of said rotary drive element, said recess is delimited by a circular lateral partition coaxial with said one of the toothsets, the circular lateral partition and the one of the toothsets delimit between them an annular space, wherein one of the two coaxial toothsets of the rotary driving element is on an annulus having an internal and an external circumferential surface, wherein said one of said toothsets on said annulus is disposed on the internal circumferential surface thereof.

2. The transmission housing as claimed in claim 1, wherein the wall of the rotary driving element has two opposite faces and in that the toothsets are arranged one projecting from one of the faces, and the other projecting from the other face of said wall.

3. The transmission housing as claimed in claim 2, wherein one of the toothsets is made on the annulus made in one piece with the wall of the rotary driving element extending projecting from one of the faces of the wall, said annulus having an internal circumferential surface and an external circumferential surface, said toothset being disposed on the internal circumferential surface of said annulus.

4. The transmission housing as claimed in claim 2, wherein one of the toothsets is formed on a shaft end projecting from one of the faces of the wall and made in one piece with said wall, this toothset being arranged on at least part of the external peripheral surface of said shaft end.

5. The transmission housing as claimed in claim 1, wherein the helical toothsets have helices in the same direction.

6. The transmission housing as claimed in claim 1, wherein the helical toothsets have helices of opposite direction.

7. The transmission housing as claimed in claim 1, wherein the rotary driving element is made of synthetic material.

8. The transmission housing as claimed in claim 1, wherein the device for transmitting the rotational movement of the rotary driving element to the output shaft is a toothed wheel integral in terms of rotation with the output shaft and in meshed engagement with one of the toothsets of the rotary driving element.

9. A geared motor unit comprising an electric motor fitted with a motor shaft and a transmission housing which can be coupled to the motor shaft of said motor,
  wherein the transmission housing is in accordance with claim 1 and in that, in the state in which the motor shaft and the transmission housing are coupled, the motor shaft is in mesh with the rotary driving element of the transmission housing.

10. A wheeled machine equipped with a geared motor unit wherein the geared motor unit is in accordance with claim 9.

* * * * *